United States Patent [19]

Andresen, Jr.

[11] 3,742,325

[45] June 26, 1973

[54] PLURAL INPUT MODE SERVO DRIVEN AIR DATA COMPUTER

[75] Inventor: John H. Andresen, Jr., Hewitt, N.J.

[73] Assignee: Intercontinental Dynamics Corporation, Englewood, N.J.

[22] Filed: Feb. 2, 1971

[21] Appl. No.: 111,955

[52] U.S. Cl.............. 318/591, 318/584, 318/636, 318/637
[51] Int. Cl. ............................................. G05b 7/00
[58] Field of Search................... 318/591, 584, 636, 318/637

[56] References Cited
UNITED STATES PATENTS

| | | | |
|---|---|---|---|
| 2,994,020 | 7/1961 | Buffet-Beauregard et al...... | 318/591 |
| 3,515,961 | 6/1970 | Allen, Jr. ............................ | 318/591 |
| 2,681,777 | 6/1954 | Rossire ............................. | 318/591 X |

*Primary Examiner*—T. E. Lynch
*Attorney*—Ostrolenk, Faber, Gerb & Soffen

[57] ABSTRACT

A device for indefinitely holding and storing the value of any one of a plurality of function inputs at a given instant for generating a hold output representative of the deviation, magnitude and direction from the stored hold signal, which condition is continuously monitored for any time interval desired by the operator.

The system is especially adapted for use with an air data computer wherein it is desired to generate a hold signal from any one of a plurality of function inputs which normally may be comprised of altitude, altitude rate, airspeed and Mach. Any one of the function inputs may be selected by generation of an appropriate signal to couple one of the plurality of function inputs to a digital or electromechanical servo unit which functions to "remember" the function input applied thereto at the time the hold signal is desired and which continuously monitors and compares the selected function input against the stored value to develop a hold signal representative of any deviation therebetween.

10 Claims, 5 Drawing Figures

PLURAL INPUT MODE SERVO DRIVEN AIR DATA COMPUTER

The present invention relates to electronic and/or electromechanical monitoring systems and more particularly to an electronic and/or electromechanical system for use as an air data computer for generating a hold signal from any one of a plurality of function inputs through the use of a single digital or electromechanical servo unit.

The present invention is advantageously adapted for use in an air data computer in which there are two or more "hold" outputs, wherein no more than one of which is required to be used at any particular time. As one example, an aircraft auto pilot system may be commanded by the pilot to hold (maintain) an existing aerodynamic function such as altitude, altitude rate, Mach, or airspeed by depressing one of four buttons provided in the auto pilot unit and marked according to these functions. In the case where each of the functions is achieved through the use of the aircraft's elevators, only one such command is controlling at any given time, which feature is taken into account in the present invention to yield a novel and advantageous design, as will become apparent from the ensuing description.

STATE OF THE ART

In present day electromechanical air data computers it is typical to provide a shaft for each aerodynamic function. Through electrically actuated clutches, each shaft is clutched to its own electromechanical pickoff (synchro), which is normally held at its zero output position (nulled condition) by centering springs which control the position of the synchro output when the clutch is open or disengaged. When any one of the clutches is closed (i.e., engaged), its synchro output is switched to the autopilot. Any deviation of the function shaft will then produce an electrical signal representative of the sense and magnitude of the deviation from the value at the time that the clutch was engaged.

There have been other analog and digital methods which have been employed in the past in which the function to be "held" is constantly followed up by an electromechanical or digital servo so as to develop a nulled output when the "hold" function is not being utilized by the autopilot. As soon as it is desired to hold that function, the follow-up servo is stopped and its value at that moment is retained as a reference value. Any deviation of the function from the reference value is transferred to the computer as a "hold" signal which is employed by the autopilot to make the necessary corrrections to the elevators to return the aircraft to the reference value of the function.

THE INVENTION – ITS ADVANTAGES AND OBJECTS

The present invention is characterized by providing hold signals only when required so as to eliminate the need for plural follow-up means when such devices are not being used to develop a holding signal.

The present invention is characterized by providing only single follow-up servo means which through the unique design of the present invention may be rapidly and reliably time-shared by the plural input functions. By depressing the appropriate button representing the desired function input for which a hold signal is to be generated, the function commanded at the time the appropriate button is depressed is automatically coupled to the single follow-up servo means in order to follow-up the function commanded at the time the button is depressed. Then, only after the null has been achieved, the difference signal is switched to the autopilot with the time interval between selection and development thereof being less than one second and preferably of the order of one-half second.

The present invention, in one preferred embodiment thereof, is comprised of means for converting pilot and static pressures into electrical voltages which are linear with pressure, altitude and indicated airspeed, respectively. These outputs are converted into voltages which are linear with altitude voltage and linear with airspeed through the use of associated function generators. Differentiation means are provided for deriving an altitude rate signal from the altitude signal and function generator means and multiplier means are provided for generating a Mach signal from the altitude and airspeed signals.

The altitude, altitude rate, airspeed and Mach output signals may be selectively connected to one input of a followup servo unit through selectively operated switching means controlled by an operator (i.e., pilot) at the time that the operator desires to generate a holding signal for any one of the function inputs. The operation of the follow-up servo is immediately initiated to store the value of the function input selected and, after having achieved a nulled condition, is then constantly compared against the selected function input for any time interval desired by the operator in order to generate the selected hold signal whose value is representative of both the magnitude and direction of the deviation from the value of the function input stored at the initiation of the hold signal operation.

The system is further provided with means for preventing the generation of the hold signal until the follow-up servo means has achieved a nulled condition, which means further serves as a means for monitoring the operation of the servo means.

Attenuator circuits are utilized to couple the selected hold signal to the autopilot so as to adjust the value of the output voltage per unit of function to adapt to the autopilots of different aircraft with different elevator response characteristics. Also, in cases where altitude and altitude rate hold signals must be varied in their output sensitivity as a function of Mach number, multiplier circuits are utilized to vary the sensitivity and volto per foot and volts per foot per minute.

The system thereby provides for selective coupling of any one of a plurality of function inputs to the follow-up servo means only at that time in which a hold signal is desired for the selected function, thereby significantly reducing the hardware required in the system, while at the same time providing rapid and reliable operation.

It is, therefore, one object of the present invention to provide a novel follow-up servo means which is uniquely time-shared by a plurality of function inputs to rapidly develop an analog representation of the function input selected and continuously monitor the function inputs against the stored analog value to thereby generate a hold output signal.

Another object of the present invention is to provide a novel follow-up servo means which is uniquely time-shared by a plurality of function inputs to rapidly develop an analog representation of the function input selected and continuously monitor the function inputs against the stored analog value to thereby generate a hold output signal and wherein further means are provided for selectively attenuating the hold signal being generated so as to make its output compatible with the autopilot connected thereto.

Another object of the present invention is to provide a time-shared follow-up servo of the means described hereinabove which is further provided with monitoring means for preventing generation of the selected hold signal until a nulled condition has been achieved by the follow-up servo means, which monitoring means further serves the function of monitoring the correct operation.

These as well as other objects of the present invention will become apparent when reading the accompanying description and drawings in which:

FIG. 1c is a block diagram showing the manner in which FIGS. 1a and 1b are arranged to form the said one preferred embodiment.

Figure 1A:
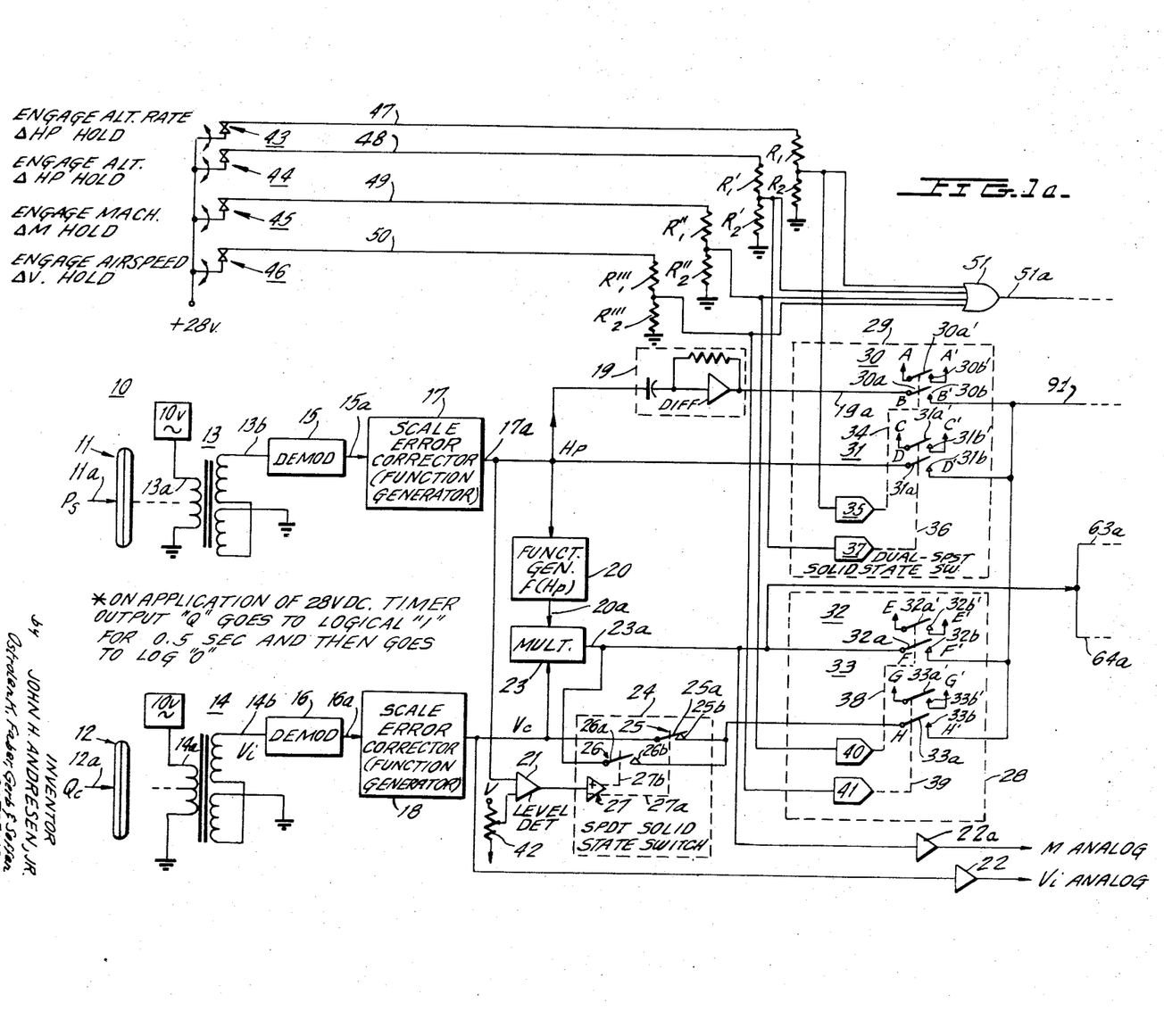
FIGS. 1a and 1b are schematic diagrams showing one preferred embodiment of the present invention.
Figures 1B, 3:
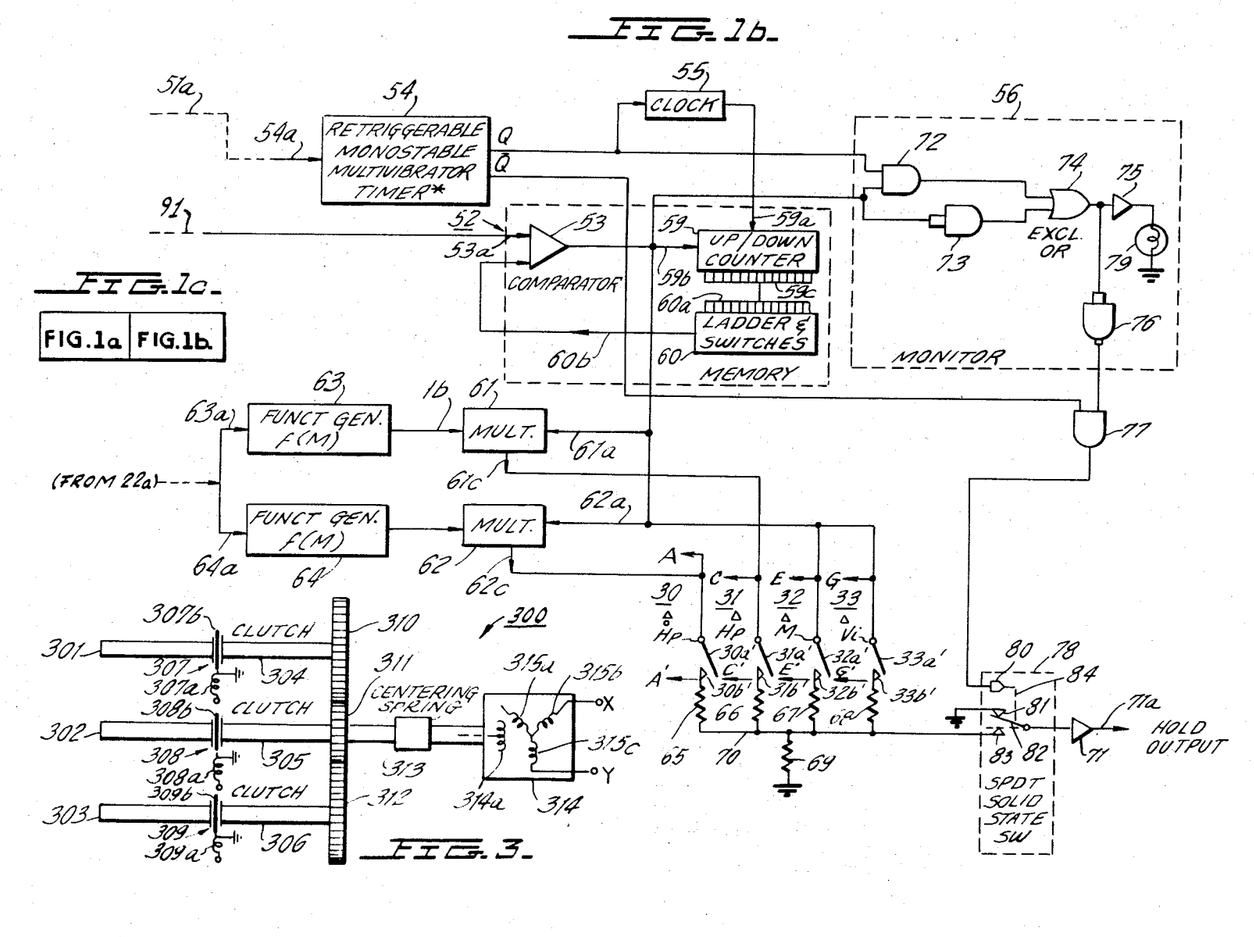
FIG. 3 is a block diagram showing still another preferred embodiment of the present invention.

The system of the present invention, in one preferred embodiment, as shown in FIGS. 1a and 1b, is comprised of first and second output transducers 11 and 12 which have applied to their inputs 11a and 12a, the static and differential pressures $P_S$ and $Q_c$, respectively, so as to vary the coupling of the primary windings 13a and 14a with their respective output windings 13b and 14b of respective transformer means 13 and 14. The output windings 13b and 14b are respectively coupled to demodulators 15 and 16 to generate d.c. voltages at their outputs 15a and 16a, respectively, which d.c. voltages are proportional to altitude ($H_p$) and airspeed ($V_c$).

The outputs of demodulators 15 and 16 are respectively coupled to the inputs of scale error corrector function generators 17 and 18, each of which converts the altitude voltages applied thereto to a linear-with-altitude function of altitude. The output 17a of function generator 17 is simultaneously coupled to the input of a differentiation circuit 19, the input of a function generator 20, the input of a level detector circuit 21 and the input of a switch means 31.

The output of function generator 18 is simultaneously coupled to the input of an amplifier 22, one input of a multiplier circuit 23 and one input of a switch means 24.

The function generator 20 couples the linear-with-altitude voltage output derived from function generator 17 to multiplier 23 to develop an output at 23a which is a voltage linear with Mach (M).

The differentiation circuit 19 converts altitude ($H_p$) to altitude rate ($dH_p/dt$). The altitude rate is obtained with a time constant preferably of approximately 3 seconds. A shorter time constant has been found to produce a rate signal which is unusable in rough air and which consequently is found to be filtered later in the system. Utilization of the longer time constant in the computer provides a better overall signal-to-noise ratio than that of an arrangement which employs a short time constant which is later filtered.

The output of differentiation circuit 19 appearing at 19a is coupled to one input terminal of a first dual, single pole, single throw, solid state switch assembly 29 comprised of individual switches 30 and 31 scehmatically represented as mechanical switches only for purposes of simplicity. As shown in the simplified fashion, each of the switch assemblies 30 and 31 is provided with a movable arm 30a–31a and a stationary contact 30b–31b, respectively. Movable arm 30a is mechanically linked (as represented by dotted line 34) to a switch arm actuating means 35. Movable arm 31a is similarly linked (through dotted line 36) to an arm actuating means 37. The movable arm 31a of switch 31 is coupled to the altitude analog output 17a of functi4n generator 17. The movable arm 30a of switch 30 is coupled to altitude rate output analog 19a.

A second dual, single pole, signal throw solid state switch 28 is comprised of switch assemblies 32 and 33 having movable arms 32a–33a and stationary contacts 32b–33b, with the movable arms being mechanically linked (through dotted lines 38 and 39, respectively) to switch arm actuating means 40 and 41, respectively.

The output 23a of multiplier 23 is coupled to switch arm 32a while the output of single pole, double throw, solid state switch 24 is coupled to movable arm 33a.

Solid state switch 24 is provided with a pair of switch assmeblies 25 and 26 having movable arms 25a–26a and stationary contacts 25b–26b. Again, it should be noted that whereas the switching assemblies are shown as being of the mechanical type, this representation is done merely for purposes of simplicity since the preferred embodiment of the switch assembly 24 is of the solid state type.

Switch assembly 24 is further comprised of a polarity sensing device 27 which, together with level detector 21, operates in the following manner:

Level detector 21 monitors the output of function generator 17 ($H_p$) and functions as a comparator by comparing the output of function generator 17 against a reference level which is established by a voltage source V and an adjustable potentiometer element 42. In the case where the output 17a is positive relative to the reference level, switch arm 26a is caused to engage stationary contact 26b while switch arm 25a is caused to be disengaged from stationary contact 25b. Conversely, if the output 17a is negative relative to the reference level, switch arm 25a engages stationary contact 25b while switch arm 26a is caused to be disengaged from its associated stationary contact 26b (the mechanical linkages being represented by the dotted lines 27a and 27b, respectively).

Thus, if the analogue signal $H_p$ is greater than the reference level, the output of multiplier circuit 23a is coupled through switch 26 to switch arm 33a. Conversely, if the level of signal $H_p$ is negative relative to the reference level, the output of function generator 18 is coupled through switch 25 to movable arm 33a.

Since only one vertical mode hold signal is utilized at any one time in the air data computer, a novel technique is employed which requires only a single memory for all hold outputs thereby greatly reducing complexity and improving reliability of the system. This operation is achieved in the following manner.

The particular vertical mode hold signal is selected by means of any one of the manually operable pushbutton switch assemblies 43–46, each of which is provided with a movable switch arm which engages an associated contact when depressed to apply a +28 volt signal to one of the associated leads 47–50, respectively. Each of these leads is coupled through a pair of series connected resistors $R_1$ and $R_2$, and $R_1'$ and $R_2'$, etc., respectively, connected in the manner shown. The common terminals between resistorm $R_1$ and $R_2$, $R_1'$ and $R_2'$, etc. are simultaneously cou0led to the control input of one of the switch arm actuating devices 35, 37, 40 and 41, respec tively, and to one input of a four-input OR gate 51.

For purposes of explanation, let it be assumed that the particular vertical mold hold signal desired is that of altitude rate. In this case, the appropriate pushbutton would be depressed, causing the movable arm of switch 43 to engage its associated stationary contact, thereby applying a 28 volt signal level to one input of OR gate 51 and to the control input of the switch arm actuator 35. This causes switch arm 30a to engage its stationary contact 30b, thereby coupling output 19a (the altitude rate analogue signal) through lead 91 to one input terminal of a comparator circuit 53 which forms part of a digital servo device 52.

The application of the 28 volt level to OR gate 51 provides a similar level at its output terminal 51a which is coupled to the trigger input 54a of a retriggerable monostable multivibrator timer 54. The manner in which the monostable multivibrator timer operates is as follows:

The two output terminals Q and Q are at opposite voltage states. Upon the occurrence of a trigger input signal at trigger terminal 54a, the output states at Q and Q are reversed. These reversed conditions are maintained for a time interval after which the monostable multivibrator resets itself so as to develop output levels of the original states at outputs Q and Q. In the present embodiment, the timing of the multivibrator is such as to abruptly change or reverse states upon the application of the trigger signal and maintain these states for an interval of 0.5 seconds, at which time the outputs Q and Q are abruptly reversed to their original levels.

Output Q is simultaneously coupled to one input of 100 KH$_z$ clock (oscillator) 55 and to one input of a gate 72 provided within a monitor circuit 56, to be described in more detail hereinbelow. Output Q is coupled to one input of AND gate 77 whose operation will be more fully described.

The output of clock 55 is coupled to one input terminal 59a of an up/down counter 59, having a second input terminal 59b coupled to the output of comparator 53. Up/down counter 59 is a multistage electronic counter capable of developing a binary output at its output terminals 59c representative of the count stored within the counter 59. The output terminals 59c are respectively coupled to input terminals 60a of a digital to analogue converter 60 which may, for example, be a ladder network and which functions to develop an analogue signal at its output 60b which is representative of the binary state of counter 59. This output is coupled to the remaining input of comparator 53.

The operation of the digital servo circuits 52 is as follows:

As was previously described, when a commanded voltage (28 volts d.c.) appears at any one of the four hold inputs (i.e. any one in the lines 47–50), the voltage analogue of the function selected is switched to one input 53a of comparator circuit 53 (under selective control of the switch arm actuators 35, 37, 40 and 41, respectively). It can be seen that the stationary contacts 30b–33b are all connected in common to lead 91.

Comparator 53 compares the level of the input applied at 53a, for example, the altitude rate, with the output level of digital to analogue converter 60 which, in turn, reflects the binary count contained in up/down counter 59. Simultaneously therewith the command voltage (28 volts d.c.) triggers the multivibrator timer 54 which reverses the voltage states at outputs Q and Q for 0.5 seconds.

The change of voltage level at output Q starts the 100 KH$_z$ clock 55 which applies pulses at the clock rate to the up/down counter. The counter counts up or down, depending upon the sense or polarity of the signal appearing at the output of comparator 53 until the comparator reaches a null condition. The comparator is brought to a null when the counter has reached a digital value which, when converted to a d.c. voltage analogue, is equal to the input applied at 53a of the comparator. Thus, the memory very rapidly tracks the incoming signal abruptly after the hold command is received in order to hold that particular input as a reference value.

At the end of the 0.5 second time interval, the output levels at Q and Q reverse state to abruptly deenergize clock 55, thereby terminating the application of pulses to up/down counter 59. The digital to analogue converter 60 thus generates a constant d.c. voltage level at its output 60b, which value is held constant as a result of the fact that counter 59 has been stopped. The value at this time represents the altitude rate (or the altitude, Mach or airspeed, as the case may be) while the output from the comparator is the raw hold signal. The reference value stored in the up/down counter 50 is retained until another function input is selected. So long as the hold signal selected is maintained on line (in the example given, the altitude rate) the altitude rate function input is constantly monitored by comparator 53 which compares this value against the reference level developed by digital to analogue converter 60. The outpt of comparator 53 represents both the magnitude and direction of the deviation of the altitude rate function input being compared against the reference value.

The output of comparator 53 is further simultaneously coupled to the inputs 61a and 62a of multiplier circuits 61 and 62, respectively.

The Mach output of multiplier circuit 23 can be seen from the figure to be simultaneously coupled to the inputs 63a and 64a of mach function generators 63 and 64, respectively through amplifier 22a. In the case where the system is operating under either the altitude or altitude rate hold load, the hold output is switched to the multipliers 61 and 62 to attenuate the signal by a function of Mach which is an approximation to that function of the true airspeed at standard atmospheric temperatures. This can be seen to be carried out by multipliers 61 and 62 which, in addition to receiving the raw hold signal output of comparator 53, receive the outputs of function generators 63 and 64 to generate a produce signal at their outputs 61c and 62c, respectively, which are each respectively applied to the switch arms 31a' and 30a' of switches 31 and 30, respectively. It should be noted that the switches 30–33 described hereinabove are further comprised of a second switch arm 30a'–33a' and cooperating stationary contacts 30b'–33b' which function simultaneously with the selective operation of switch arms 30a–33a to respectively engage their associated stationary contacts 30b–33b. These switches are shown in FIG. 1a to clarify these operations as being under control of actuating means 35, 37, 40 and 41 respectively and are further shown in FIG. 1b to show these electrical connections with resistors 65–68 respectively. in the example given hereinabove, wherein altitude rate has been selected, switch arms 30a and 30a' are simultaneously actuated to engage their cooperating stationary contacts 30b and 30b', respectively, under control of the switch arm actuator 35. It should be understood that the remaininG switch arms 31a'–33a' operate in a similar fashion. Thus, when either the altitude rate or altitude hold command is given, the hold output is switched to a multipler which attenuates it by a function of Mach as was described hereinabove.

The signal then passes through a second attenuator comprised of a resistor coupled in series with each of the stationary contacts. As shown in FIG. 1b, resistors 65–68 each have a first terminal coupled to an associated stationary contact 30b'–33b'. The remaining terminal of the resistors 65–68 are coupled in common through a conductor 70 which is also connected to one terminal of resistor 69 whos opposite terminal is coupled to ground or reference potential. The values of resistors 65–68 are chosen to scale the output to a value of 50–150 percent of the output level applied to the input of switch arms 30a'–33a'.

In the case where the system is operating in either the Mach or airspeed hold mode, the raw hold signals appearing at the output of comparator 53 are coupled directly to their associated switch arms 32a' and 33a'. The vertical mode output is buffered through buffer circuit 71 for the purpose of reducing output impedance.

The self-monitoring feature of the system is provided by monitoring circuit 56 comprised of gates 72–76. To better appreciate the benefits of the self-monitoring circuit, it should be noted that it is not possible to monitor a pressure transducer except by comparison with another like device. Likewise, the function generators and multipliers of the system cannot be monitored in a meaningful manner. It is the action of the digital servo assembly 52 which produces the hold functions which are capable of being monitored. These elements and their associated switching circuits constitute 80 percent of the computer and represent the major portion of the failure hazzard.

The logic and operation of the monitor circuit 56 is as follows:

The output Q of monostable multivibrator 54 is coupled to one input of NAND gate 72, while ouptut Q is coupled to one input of AND gate 77. The remaining input of NAND gate 72 is coupled to the output of comparator 53 which is also simultaneously coupled to one input of inverter 73. The outputs of gates 72 and 73 are coupled to the inputs of exclusive OR gate 74 whose output is simultaneously coupled to buffer amplifier 75 and inverter 76. The output of inverter 76 is coupled to the remaining input of AND gate 77, whose output is coupled to the switch actuating means 80 of a solid state, single pole, double throw switch mechanism 78.

Each time a hold signal is commanded, it is verified that the output voltage of comparator 53 has been reduced to a null condition by the completion of the 0.5 second follow-up period alloted by the timer for performing the follow-up process. For example, during the 0.5 second interval, output Q is at a high level to energize clock 55. As soon as the interval has been completed, output Q goes to a low level which is applied to one input of NAND gate 72. When and only when the output of comparator 53 has been nulled after the completion of the 0.5 second interval, its output will go negative or low, which condition is applied to the remaining input of NAND gate 72. When both inputs of NAND gate 72 are low, its output will go high. When the output of comparator 53 is low, this condition is further coupled to the input of inverter 73 which develops a high level at its output. When one and only one of the inputs applied to exclusive OR gate 74 is high, the output of exclusive OR gate 74 will go high, causing lamp 79 to be lit and thereby indicating faulty or erroneous operation of digital servo 52. If the digital servo has operated successfully, both input levels to gate 72 will be low, causing its output to be high and likewise the input of inverter circuit 73 will be low causing its output to go high, thereby causing the output of exclusive OR gates 74 to be low so as to prevent warming lamp 79 from being illuminated. If either the comparator has failed to reach a null condition, or the multivibrator has yet to switch its output levels (indicating the end of the 0.5 second interval), either one or both of the inputs to NAND gate 72 will be high, causing its output to go low thereby causing exclusive OR gate 74 to go high to illuminate lamp 79. The output of exclusive OR gate 74 is inverted by inverter circuit 76. Thus, when the output of exclusive OR gate 74 is low (indicating proper operation of the digital servo device 52) the output of inverter 76 will go high and this level is applied to one input of AND gate 77. The remaining input is coupled to the Q output of monostable multivibrator 54.

Thus, if a null has not been achieved, the common lead 70 to which the attenuator resistors 65–68 are coupled is disconnected from hold output 71a by means of the solid state switch 80 which functions in the presence of a high level at the output of gate 77 to couple movable switch arm 82 (through the linkage represented by dotted line 84) to ground reference. In this manner, the failure of the total digital servo loop is checked for determining its functional operation which also includes the operation of clock 55, up/down counter 59, digital to analogue converter 60 and comparator 53. A partial check is also made on the hold output switch and hold input switches. At the same time that the monitor inhibits the output, it energizes the failure warning light which indicates the condition to the pilot. To facilitate the presence of a warning condition, it is suggested that the warning lamp be placed adjacent to the vertical mode selector switch. The simplicity of the monitor circuit 56 serves to provide a low probability of false alarms.

In the preferred embodiment, the transducers, with their scale error-correctors, have been found to provide analogue outputs to an absolute accuracy of ± 3 percent. They have no slope variation from nominal greater than ± 5 percent of nominal over any part of the operating ranges. This accuracy is achieved with a ± 10 percent tolerance on the 400 $H_z$ supply voltage and a ±5 percent tolerance on frequency over an ambient temperature range from 25°–50° C.

The digital servo 52 employed to store the reference function has a resolution of $2^{16}$ a full range. This is equivalent to one foot in the altitude function and is much higher than is needed for the other three functions. Allowing for noise, an engage offset of about four bits is obtained, i.e. four feet on altitude hold. Resolution of the hold outputs is theoretically limited by noise and friction threshold by the transducers.

The system, in solid state electronic form, provides an extremely long useful operating life which can especially be attributed to the fact that no moving parts are employed within the system.

Figure 2:
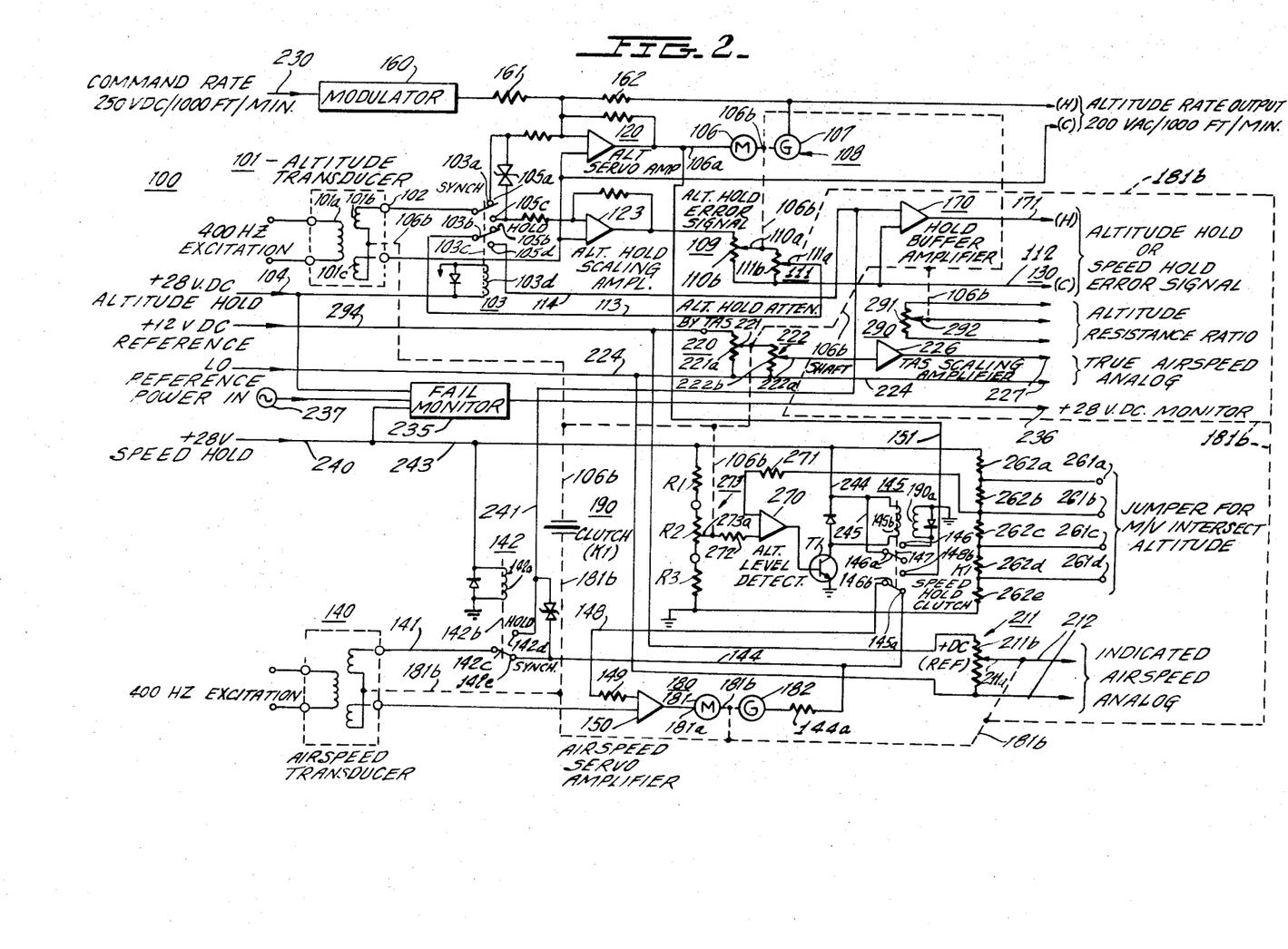
FIG. 2 is a schematic diagram showing another preferred embodiment of the present invention.

FIG. 2 shows an alternative embodiment for the present invention generally designated by the numeral 100 and which is comprised of an altitude transducer 101 adapted to generate an output signal linear with altitude. The transducer 101 is one in which the displacement of a diaphragm capsule (not shown for purposes of simplicity) rotates the I armature of an E-I inductive pick-off. The E of the pick-off is rotated coaxially to re-null the pickoff by means of a mechanical shaft rotation input. Transducers of this type are described, for example, in U.S. Pat. No. 3,365,928 (note especially the controller 16 having a differential transformer 40 in FIG. 2) assigned to the assignee of the present invention and which is incorporated herein by reference thereto. For this reason a detailed description thereof will be omitted herein for purposes of simplicity.

The E core (see element 41 of U.S. Pat. No. 3,365,928) can be rotated by the conventional a.c. servo system to null the pick-offs when the hold signals are not being used. This provides shaft rotations linear with pressure altitude. The windings 101a, 101b and 101c (also see windings 47, 48 and 49 of above mentioned patent) are mounted on "E" core (41 of above mentioned patent). Windings 101b and 101c are in series opposing relationship. The I-shaped core is moved by the diaphragm 11 (or 46 of above mentiond patent). The E shaped core 41 is driven by the shaft 106b to "null" the transducer.

The output of the transducer is taken from lead 102 so as to be selectively applied, through switch means 103 to either an altitude servo amplifier 120 of an altitude hold scaling amplifier 123. Switch means 103 is coupled to a suitable manual switch (not shown herein for purposes of simplicity) which, when the altitude hold mode is desired, applies a 28 volt d.c. level at input 104. This energizes the solenoid 103d of switch means 103 to pull down switch arms 103a and 103b from their normal position, as represented by the mechanical linkage shown by the dotted line 103c. In the absence of an altitude hold mode, the solenoid coil 103d is deenergized causing switch arms 103a and 103b to engage stationary contacts 105a and 105b, respectively. In the presence of an altitude hold mode, relay coil 103d is energized, causing switch arms 103a and 103b to engage stationary contacts 105c and 105d, respectively.

In the absence of the altitude hold mode, the output of transducer 101, appearing at 102, is coupled through switch arm 103a and contact 105a to the input of an altitude servo amplifier 120. The output signal is applied to the motor input 106a of a motor 106 which forms part of a motor-generator servo mechanism further comprised of generator 107, the servo being designated generally by the numeral 108. The energization motor 106 causes its output shaft 106b (shown in dotted line fashion) to control the output signal of generator 107 and is further simultaneously coupled to altitude transducer 101 to provide a null condition therefore, thereby constantly following up the altitude value developed.

In the altitude hold mode, the altitude servo 108 is stopped by application of a 28 volt d.c. level at input 104, causing switch means 103 to move switch arms 103a and 103b to stationary contacts 105c and 105d, respectively. In this mode, the output of the altitude transducer 101, taken from terminal 102, is applied to the input of an altitude hold scaling amplifier 123 which, in turn, applies the state of the altitude transducer to one terminal of an adjustable potentiometer 109 comprised of a movable arm 110a and resistance element 110b. The movable arm can be seen to be mechanically coupled to the output shaft 106b of motor 106, the value of which remains constant in the altitude hold mode. Switch arm 110a is further electrically coupled to a second potentiometer 111 comprised of a resistance element 111d and a rotatable switch arm 111a which is mechanically coupled (as shown by dotted line 181b) to the output shaft of the airspeed servo 180 to be more fully described.

The opposite terminal of resistor 111b is connected to ground or reference potential, as represented by lead 112. It should be noted that the opposite terminal of resistor element 110b is also coupled to lead 112.

Rotatable switch arm 111a is further electrically coupled through lead 113 to switch arm 103b in order to apply the signal level of the potentiometers 109 and 111 (connected in cascade) to a second lead line 114 which couple the output signal to one input of a hold buffer amplifier 170 whose out-put provides a signal representative of the altitude hold in the following manner;

Servo 108 follows up the output of altitude transducer 101 to provide a null condition until a hold mode is desired, at which time the position of shaft 106b establishes a "hold" condition. Any deviation from this value is caused by the output of the diaphram which derives the I-shaped core (element 42 of above mentioned patent). The unbalanced condition developed by series opposing windings 101b and 101c develops a resultant signal whose polarity represents the direction of change and whose value represents the magnitude of the deviation. Potentiometers 109 and 111 attenuate the resultant signal to the correct sensitivity value. For high speeds the signals are attenuated to a larger degree while for low altitudes little or no attentuation of the deviation signal occurs.

Airspeed transducer 140 is similar in design and function to altitude transducer 101 (and to the device 16 of the above mentioned patent) and provides its output signal at lead 141 which is coupled to the switch arm 142c of the vertical speed hold switch 142 which is mechanically coupled to the relay coil 142a as represented by dotted line 142b.

In the absence of a speed hold mode, movable arm 142c engages stationary contact 142e to apply the output of air speed transducer 140 through lead 144 and switches 145a–146b to the input resistor 149 of servo amplifier 150. Amplifier 150 energizes input 181a of motor 181 which forms part of the airspeed servo designated generally by the numeral 180 and which is further comprised of generator 182.

Stationary contact 142e is connected by lead 144 to the stationary contact 145a of a switch 145 which is further comprised of relay coil 145b, switch arm 146a, and switch arm 146b, which are mechanically coupled to the solenoid as represented by dotted line 147. In the absence of a vertical speed hold mode and in the case where switch means 145 is deenergized, switch arm 146b engages contact 145a to apply the output of airspeed transducer 140 to the input of airspeed servo amplifier 150 through lead line 148 and resistance element 149.

The output of airspeed servo amplifier 150 is coupled to the input control 181a of motor 181 causing its output shaft 181b to be rotated. Output shaft 181b is simultaneously coupled to one end of a clutch assembly 190, to the E core of transducer 140, to the input shaft of generator 182, the switch arm 211a of potentiometer 211, switch arm 111a of a potentiometer 111, and switch arm 222a of a potentiometer 222.

In the absence of a speed hole mode the airspeed servo mechanism 180 continuously follows up the output level of airspeed transducer 140 so as to provide a null condition at its output 141.

Upon the initiation of a vertical speed hold, the altitude hold command remains energized and a d.c. vertical speed input signal proportional to the desired rate is applied at input terminal 230. This signal is modulated by modulator 160 at a 400 Hz rate. The modulated signal is applied to one input terminal of altitude servo amplifier 120 through a resistor 161. It should further be noted that the electrical output of generator 107 is applied to a resistor 162 to the input of altitude servo amplifier 120. Thus, it can be seen that the modulated signal is summed with the altitude servo rate generator output voltage. The resultant sum appears at the output of altitude servo amplifier 120 and is applied to servo motor 106. This causes the altitude servo to change the position of the "E" core in altitude transducer 101 at a rate proportional to the applied d.c. vertical speed command voltage applied at input terminal 230.

In both the altitude hold and vertical speed hold modes, the altitude transducer output is attenuated linearly with TAS (true airspeed) which is generated by two potentiometers 109 and 111 which are driven from the airspeed and altitude servo motor shafts 106b and 181b, respectively. The resultant signal appears in line 113 which, in the hold mode, is coupled to lead line 114 through movable switch arm 103b and stationary contact 105d so as to be applied to one input of the hold buffer amplifier 170 which amplifies the signal to the correct sensitivity value. Resolution and altitude are not impaired by any servo friction or clutch action and hence is better than the equivalent of one foot at see level of all altitudes and rates.

Airspeed hold is obtained at the hold output in response to the 28 volt d.c. speed command input applied at input terminal 240, in a manner analogous to the altitude hold, wherein the output of airspeed transducer 140 is decoupled from amplifier 150 (and hence servo 180) and is connected to hold amplifier 170 by switch arm 142c, contact 142d and conductor 241. The movement of the "I" core of airspeed transudcer 140 by its diaphragm (see 12 of FIG. 1a) develops a deviation from the hold or nulled condition existing just prior to initiation of the speed hold mode. Servo 180 no longer "nulls" the airspeed transducer upon initiation of the hold mode since its input is disconnected from transducer 140 by the operation of switch 142. The transducer output of airspeed transducer 140 is adjusted to the specified, constant sensitivity and volts per knot and, as a result of the application of a 28 volt d.c. level to input terminal 240 is switched to lead line 241 due to the energization of switch 142, pulling switch arm 142c into engagement with stationary contact 142d.

Stationary contact 142d is coupled through line 241 to the input of hold buffer amplifier 170, which amplifies the signal to the correct sensitivity level, which signal is available at the hold output terminal 171.

For operation in the Mach hold mode, the speed hold command remains 'On.' Above a predetermined altitude (which is selected by jumpers on the units connector as represented by terminals 261a–261d) the airspeed servo shaft is automatically, mechanically clutched to the shaft of the altitude servo. The manner in which this is achieved is through the altitude level detect circuit comprised of a level detector amplifier 270 having a first input coupled through resistor 271 to a chain of series connected resistor 262a–262e, respectively. The particular voltage at one of the jumper connectors 261a–261d, as a result of applying shorting jumpers between combinations of terminals 261a–261b, establishes a reference level at one input of the altitude level detector 270. The remaining input of detector 270 is coupled through resistor 272 and a potentiometer generally designated by the numeral 273 and comprised of a movable switch arm 273a and a resistance element R2. One terminal of resistance element R2 is connected through resistor R1 to the speed hold command line 240, while the remaining terminal of resistance R2 is coupled through resistor R3 to ground or reference potential.

The movable arm 273a can be seen to be mechanically coupled to output shaft 106b of servo motor 106 so that the position of switch arm 273a relative to its associated resistance element R2 establishes the voltage level applied to altitude level detector 270, which voltage level, in turn, is controlled by altitude transducer 101.

As soon as the predetermined level is detected, detector 270 applies an output signal to transistor $T_1$ to energize switch 145. Energization of switch 145 causes switch arms 146a and 146b to engage stationary contacts 146 and 148b, respectively, thereby decoupling the output of airspeed transducer 140 from the input of amplifier 150 and coupling this amplifier input through lead 151 to the input 106a of servo motor 106.

Engagement of movable switch arm 146a with stationary contact 146 applies the 28 volt d.c. level through leads 243, 244, 245, switch arm 146a and contact 146 to the speed hold clutch solenoid coil 190a to energize clutch 190 causing the airspeed servo shaft 181b to be mechanically coupled to the shaft of the altitude servo 106b. Gear ratios in the shafts to clutch 190 are chosen so that the "E" core of the airspeed transducer pick-off is driven by the altitude servo and assisted by the airspeed servo motor by the correct amount so that the output hold signal will be Mach rather than airspeed. This is a curve matching process and is accurate to 0.005 Mach over the range where Mach hold is used (i.e. above that at which the altitude level detector 270 indicates the appropriate altitude level for Mach hold).

In effect, the system is on airspeed hold at all times with the value of airspeed changing at higher altitudes to maintain a constant Mach number.

The switchover altitude for obtaining Mach hold is obtained by the aforementioned d.c. bridge comprised of resistors R1 and R3 in series with a potentiometer whose switch arm 273a is driven by the altitude shaft servo 106b which instantaneous value is compared against a reference voltage level established by the voltage divider comprised of resistors 262a–262e. By connecting jumper wires across one or more of the jumper terminals 261a–261d it is possible to obtain seven different voltage ratios. A phase detector 270 at the bridge output switches to the Mach hold condition above the reference altitude level.

The altitude analogue is obtained from a potentiometer 290 comprised of a resistance element 291 and a switch arm 292 mechanically coupled to the altitude servo shaft 106b.

The airspeed analogue is obtained from a potentiometer 211 comprised of a switch arm 211a and a resistance element 211b which is mechanically coupled to and driven by the output shaft 181b of the airspeed servo 180. One terminal of resistance element 211b is coupled to the 12 volt d.c. reference line 294 with the output (representing indicated airspeed) appearing across leads 212.

The true airspeed (TAS) analgoue is obtained from a linear potentiometer 222 comprised of switch arm 222a mechanically coupled to the airspeed servo output shaft 181b and a resistance element 222b having one terminal electricaly connected to the switch arm 221 of a potentiometer 220. Switch arm 221 is mechanically coupled to and driven by the output shaft 106b of the altitude servo 108. One terminal of its associated resistance 221a is electrically coupled to line 224 with the remaining terminal being electrically coupled to the 12 volt d.c. line 294. Switch arm 222a is electrically coupled to the input of a scaling amplifier 226. The position of switch arm 222a is controlled by the airspeed shaft 181b, while the position of switch arm 221 is controlled by the output shaft 106b of the altitude servo 108 to provide a d.c. voltage which is approximately linear with TAS based on standard temperature for the altitude being flown. The output signal is amplified by amplifier 226 to the correct scale factor with the TAS signal being made available at output terminals 227.

The TAS attenuator for the altitude hold error signals is similar in principal to the above TAS analogue output. Verification of the proper operation of the system is obtained through the use of a logic circuit 235 which monitors the 115 volt 400 Hz source 237 and the presence of a signal in either line 104 or 240 to provide an output signal at terminal 236 whenever either source 237 or both signals appearing at lines 104 and 240 are absent, or when all three signals are absent.

FIG. 3 shows another preferred embodiment of the present invention wherein an electromechanical arrangement may be substituted for the digital servo embodiment of FIG. 1. In electromechanical air data computers, a shaft is provided for each aerodynamic function. For example, FIG. 3 shows an embodiment 300 in which shaft 301–303 each represent a particular function such as, for example, altitude, airspeed and Mach. The direction of rotation is representative of the direction of deviation of the particular values while the amount of rotation represents the magnitude of the deviation. The output end of each of the shafts 301–303 is releaseably coupled to an associated output shaft 304–306, respectively, through a clutch assembly 307–309, respectively. Each of the clutches is provided with an operating solenoid 307a–309a, respectively, which when energized by an altitude speed or Mach hold signal (which may, for example, be 28 volts d.c. as in the foregoing embodiments described hereinabove) acts to actuate its associated clutch assembly 307b–309b, respectively, to couple only one of the shafts 301–303 to its associated shaft 304–306, respectively, at any given time (dependent upon the particular hold mode desired). The right-hands ends of each of the shafts 304–306 is provided with a gear 310–312, respectively. The gears are of appropriate numbers of teeth to obtain desired scale factors and are meshed in the manner shown. Shaft 305 extends through gear 311 where it is connected with a centering spring mechanism 313 and extends still further so as to be coupled to the input of a synchro 314 having an input winding 314a and a three-phase output winding arranged in "Y" fashion and comprised of windings 315a–315c. Only windings 315b and 315c need be employed in the present embodiment. Winding 314a is energized by a suitable a.c. source (not shown) and its orientation is controlled by the position of shaft 305.

When any one of the clutches is actuated, its associated shaft (i.e. one of shafts 301–303) is mechanically coupled to one of the output shafts 304–306 (to the exclusion of the remaining two shafts). The position of the one shaft of the group of shafts 301–303 constitutes a hold or reference position at the time that a hold mode is initiated. Any deviation from that position operates against centering spring mechanism 313 to change the orientation of primary winding 314a. Prior to the initiation of any of the hold modes, centering spring 313 establishes the orientation of winding 314a, establishing a null condition across the output terminals X and Y. Any deviation from this position is controlled by the shaft 301–303 which is coupled to shaft 305 through its associated clutch to establish a deviation signal. Thus, FIG. 3 shows an electromechanical arrangement in which a reference value is obtained after initiation of a hold command through the use of a single servo device. A device of the type designated by numeral 314 in FIG. 3 is also shown in the aforementioned patent and is designated by numeral 55 shown in FIG. 2 thereof. Therefore, any further detailed description will be omitted herein for purposes of simplicity, in being understood that the description set forth in the above mentioned U.S. Patent is incorporated herein by reference thereto.

It can be seen from the foregoing description that the present invention provides a novel electronic and/or mechanical servo system capable of rapidly and accurately developing and holding any one of a plurality of function inputs through a unique time-share arrangement while providing in at least one embodiment, self-monitoring of the system to assure its accurate and reliable operation, and at the same time providing, in at least one embodiment, adjustable attenuator means for assuring the fact that the particular hold mode signal being developed at any given time is completely compatible with the auto pilot unit coupled to the vertical hold output of the system to assure optimum sensitivity of the auto pilot and thereby assure highly reliable operation thereof.

Although there has been described a preferred embodiment of this novel invention, many variations and modifications will now be apparent to those skilled in the art. Therefore, this invention is to be limited, not by the specific disclosures herein, but only by the appending claims.

The embodiments of the invention in which an exclusive privledge or property is claimed are defined as follows:

1. Means for generating a hold signal for any one of a plurality of monitored conditions comprising:
   plural input means being adapted to generate a signal representing the condition being monitored;
   signal storage means for storing any such signal;
   switch means for selectively coupling any one of said input means to said storage means;
   said storage means including means for storing the value of the signal coupled thereto at the time that the selected input means is coupled thereto and for retaining the stored value indefinitely;
   means for continuously comparing the stored value in storage means against the output signal of the input means coupled to said storage means for developing a hold signal representing the deviation of the signal from its stored value;
   output means for receiving said hold signal from said comparison means; said switch means including means for clearing said storage means each time a new input means is selected to store the signal value of the last selected in put means;
   said storage means comprising an up-down counter;
   oscillator means for pulsing said counter;
   means responsive to the operation of said switch means for activating said oscillator means for a predetermined time interval upon the operation of said switch means.

2. The device of claim 1 wherein said comparison means is coupled to said up-down counter means for controlling the counting direction of said up-down counter means through the comparison of stored value in said counter means and the value of the signal applied to said comparison means through said switch means.

3. The device of claim 2 wherein each of said input means is adapted to generate analog signals;
   means coupled between said counter means and siad comparison means for converging the state of said counter means into an analog signal for use by said comparison means.

4. The device of claim 1 wherein said means for activating said oscillator means is comprised of a monostable multivibrator responsive to operation of said switch means for activating said oscillator means for a predetermined time interval.

5. The device of claim 4 further comprising monitoring means coupled to said monostable multivibrator and said comparison means for generating an alarm to indicate failure of said counter means to store the value of the signal developed by the input means coupled thereto when said multivibrator has been reset.

6. The device of claim 5 wherein said monitoring means is further comprised of means for disconnecting the output of said comparison means from said output means until the value of the signal of the input means connected to said counter means has been stored in said counter means.

each of said attenuating means being adapted to attenuate the signals applied thereto by differing amounts.

7. A means for developing a hold signal from only one of a plurality of monitored conditions in order to constantly monitor any deviation from the desired hold signal comprising:
   single servo means including input means and an output for generating an electrical signal representing any deviation in the state of said input means, said electrical signal being maintained so long as the deviation exists;
   a plurality of first means each adapted for converting the condition which it monitors into a state compatible for operating said servo means;
   means for selectively coupling any one of said first means to said servo means input means for changing the state of said input means at any time after the first means coupled to said input means changes state causing said sPrvo means to generate an output signal representing any deviation in both sense and magnitude in the monitored condition associated with only that first means coupled to said input means after the coupling operation has occurred;
   each of said first means is comprised of a rotatable input shaft whereby the direction of rotation represents the direction of change of the monitored condition and the amount of rotation represents the amount of change in the monitored condition;
   said coupling means comprising a plurality of rotatable output shafts each being aligned with an associated one of said input shafts;
   a plurality of clutch means each being provided between associated input and output shafts for selectively coupling one of said input shafts to its associated output shaft;
   each of said output shafts being provided with gear means;
   said gear means being meshed to enable the input shafts whose associated clutch is engaged to drive all output shafts through a predetermined amount of rotation;
   one of said output shafts being a connecting shaft and being coupled to the input means of said servo for driving said input means regardless of which input shaft is coupled to its associated output shaft;
   centering means coupled to said connecting shaft for returning said connecting shaft to a reference position and for nulling the output of said servo means whenever all of said input shafts are disconnected from their associated output shafts.

8. Means for generating a hold signal from only one of a plurality of monitored conditions comprising:
   input transducer means each being adapted to generate a signal representing the instantaneous value of the monitored condition;
   each of said transducer means comprising adjustable means operable to null the output of said input means;
   servo means for each of said input means;
   hold output means;
   switch means for each transducer means for coupling the output of each transducer means to its associated servo means and decoupling each transducer means from said hold output means when in a normal condition and for decoupling each transducer from its servo means and coupling the transducer means to said hold output means when in a hold condition, whereby only one of said switch means is in said hold condition at any given time;

each servo means including means coupled to the adjustable means of its assOciated transducer means for continuously nulling the output of said transducer means when said servo means is coupled to the output of its associated transducer means;

at least first and second transducer means;

clutch means for selectively coupling the output of the servo means associated with the second transducer means to the adjustable means of said first transducer means when said clutch means is activated;

the switch means associated with said second transducer means including second switch means for selectively coupling the output of said first transducer means to the servo means associated with said second transducer means when the switch means for said first transducer means is in said hold condition for generating a modified hold signal controlled by the outputs of both said first and second transducer means.

9. The device of claim 8 wherein said clutch means is further comprised of means for activating said clutch means when said first transducer means reaches a predetermined value.

10. The device of claim 9 wherein said input means comprises means for normally causing said servo means output means to automatically be set to a zero output deviation condition prior to the coupling of any of said first means thereto.

* * * * *